United States Patent
Wang et al.

(10) Patent No.: US 11,801,529 B2
(45) Date of Patent: Oct. 31, 2023

(54) PRODUCT FOR PREVENTING DETERIORATION OF ADHESIVE LAYER AND MANUFACTURING METHOD THEREOF

(71) Applicant: KUNSHAN LIANTAO ELECTRONIC CO., LTD, Kunshan (CN)

(72) Inventors: Tao Wang, Kunshan (CN); Hong Zhang, Kunshan (CN); QingHong Zhao, Kunshan (CN); Tao Jiang, Kunshan (CN)

(73) Assignee: KUNSHAN LIANTAO ELECTRONIC CO., LTD., Kunshan (CN)

( * ) Notice: Subject to any disclaimer, the term of this patent is extended or adjusted under 35 U.S.C. 154(b) by 466 days.

(21) Appl. No.: 16/918,592

(22) Filed: Jul. 1, 2020

(65) Prior Publication Data

US 2021/0002529 A1    Jan. 7, 2021

(30) Foreign Application Priority Data

Jul. 2, 2019   (CN) .......................... 201910589171.5
Apr. 30, 2020  (CN) ......................... 202010367690.X (51) Int. Cl.
*B05D 1/38*  (2006.01)
*B05D 1/02*  (2006.01)
(Continued)

(52) U.S. Cl.
CPC ................. *B05D 1/38* (2013.01); *B05D 1/02* (2013.01); *B05D 1/28* (2013.01); *B05D 3/002* (2013.01);
(Continued)

(58) Field of Classification Search
None
See application file for complete search history.

(56) References Cited

U.S. PATENT DOCUMENTS

| 6,054,601 A | 4/2000 | Standke et al. |
| 2001/0035265 A1 | 11/2001 | Dronzek |

(Continued)

FOREIGN PATENT DOCUMENTS

| CN | 1297465 A | 5/2001 |
| CN | 1391433 A | 1/2003 |

(Continued)

*Primary Examiner* — Frank D Ducheneaux
(74) *Attorney, Agent, or Firm* — Birch, Stewart, Kolasch & Birch, LLP (57) ABSTRACT

The present disclosure provides a product for preventing the deterioration of an adhesive layer and a method for manufacturing the product. The product comprises a first product housing, a second product housing, an adhesive layer, and a protective layer. The second product housing is opposite to the first product housing. A gap exists between the second product housing and the first product housing. The adhesive layer is disposed in the gap between the first product housing and the second product housing, adhering to the first product housing and the second product housing. The protective layer is disposed on the adhesive layer. The protective layer is disposed in the gap, covering the outer surface of the adhesive layer. The protective layer bonds and cross-links to the adhesive layer chemically.

16 Claims, 3 Drawing Sheets

(51) Int. Cl.
  *B05D 1/28* (2006.01)
  *C09D 183/08* (2006.01)
  *C09J 163/00* (2006.01)
  *C09J 183/08* (2006.01)
  *C09J 7/35* (2018.01)
  *C09J 7/40* (2018.01)
  *C09J 175/04* (2006.01)
  *C09J 201/04* (2006.01)
  *B05D 3/00* (2006.01)
  *B05D 3/02* (2006.01)
  *C08K 5/00* (2006.01)

(52) U.S. Cl.
  CPC ........... *B05D 3/007* (2013.01); *B05D 3/0254* (2013.01); *C09D 183/08* (2013.01); *C09J 7/35* (2018.01); *C09J 7/40* (2018.01); *C09J 7/401* (2018.01); *C09J 163/00* (2013.01); *C09J 175/04* (2013.01); *C09J 183/08* (2013.01); *C09J 201/04* (2013.01); *B05D 2401/10* (2013.01); *B05D 2518/12* (2013.01); *C08K 5/0041* (2013.01); *C09J 2203/326* (2013.01); *C09J 2301/208* (2020.08); *C09J 2301/304* (2020.08); *C09J 2301/408* (2020.08); *C09J 2301/41* (2020.08); *C09J 2301/416* (2020.08); *C09J 2427/005* (2013.01)

(56) References Cited

U.S. PATENT DOCUMENTS

2009/0023832 A1* 1/2009 Maeda ................... C09J 133/14
                                                         522/100

2013/0235488 A1  9/2013  Andrikowich et al.
2013/0302539 A1  11/2013 Fujii et al.

FOREIGN PATENT DOCUMENTS

| | | |
|---|---|---|
| CN | 1703473 A | 11/2005 |
| CN | 1771351 A | 5/2006 |
| CN | 101252172 A | 8/2008 |
| CN | 101534786 A | 9/2009 |
| CN | 101720346 A | 6/2010 |
| CN | 101724836 A | 6/2010 |
| CN | 102076189 A | 5/2011 |
| CN | 102294851 A | 12/2011 |
| CN | 102456758 A | 5/2012 |
| CN | 102875765 A | 1/2013 |
| CN | 104350121 A | 2/2015 |
| CN | 104769072 A | 7/2015 |
| CN | 204547249 U | 8/2015 |
| CN | 105530786 A | 4/2016 |
| CN | 105984070 A | 10/2016 |
| CN | 206541232 U | 10/2017 |
| CN | 107708363 A | 2/2018 |
| CN | 107872934 A | 4/2018 |
| CN | 108141982 A | 6/2018 |
| CN | 108471687 A | 8/2018 |
| CN | 208027090 U | 10/2018 |
| CN | 109451123 A | 3/2019 |
| CN | 109602127 A | 4/2019 |
| CN | 109608974 A | 4/2019 |
| CN | 109714925 A | 5/2019 |
| CN | 109796897 A | 5/2019 |
| CN | 110484129 A | 11/2019 |
| TW | 201418026 A | 5/2014 |
| TW | 201826907 A | 7/2018 |

* cited by examiner

PRODUCT FOR PREVENTING DETERIORATION OF ADHESIVE LAYER AND MANUFACTURING METHOD THEREOF

CROSS REFERENCE TO RELATED APPLICATION

This application claims the priority benefit of Chinese Patent Application Serial Number 201910589171.5, filed on Jul. 2, 2019, and Chinese Patent Application Serial Number 202010367690.X, filed on Apr. 30, 2020, the full disclosure of which is incorporated herein by reference.

BACKGROUND

Technical Field

The present disclosure relates to the technical field of coating, particularly to a product for preventing the deterioration of an adhesive layer and a method for manufacturing the product.

Related Art

Wearable devices and portable devices have been well accepted and welcomed by consumers in recent years. The generations of products such as smart bracelets, smartwatches, smart glasses, smart earphones, and other wearable devices and smartphones, tablets, and other portable devices have been updated in a shorter period, bringing people product experiences that they never had. However, wearable devices and portable devices are often exposed to complex external environments in daily use, such as rain and tap water; they are also frequently in contact with sweat and sebum as being worn or handheld.

A general wearable device or portable device is usually equipped with an upper cover and a lower cover, wherein the upper cover is attached to the lower cover through adhesive. Unfortunately, the bonding adhesive always showed high shrinking percentage after curing process caused by molecular crosslinking and there is gap between the upper cover and the lower cover, the gap is easy to be filled by external contaminations and dust then showed a black line there. At the same time external and human contaminants could easily erode the adhesive, greatly reducing the fastening strength of the adhesive between the upper cover and the lower cover. Thus, the connection between the upper cover and the lower cover becomes unstable and contaminants would enter the inner part of the product and reduces the performance of the product.

SUMMARY

The embodiments of the present disclosure provide a product for preventing the deterioration of an adhesive layer and a method for manufacturing the product, to solve the problem of reduction of bonding strength of the adhesive disposed between the upper cover and the lower cover of wearable devices or portable devices as the adhesive is often eroded by external and human contaminants.

In the first aspect, the present disclosure provides a product for preventing the deterioration of adhesive layer, comprising a first product housing, a second product housing, an adhesive layer, and a protective layer. The second product housing is opposite to the first product housing. A gap exists between the second product housing and the first product housing. The adhesive layer is disposed in the gap between the first product housing and the second product housing, adhering to the first product housing and the second product housing. The protective layer is disposed on the adhesive layer. The protective layer is disposed in the gap, covering the outer surface of the adhesive layer. The protective layer bonds and cross-links to the adhesive layer chemically.

In the second aspect, the present disclosure provides a method for manufacturing the product in the first aspect, comprising the steps of: disposing the first product housing and the second product housing; the gap existing between the first product housing and the second product housing; applying an adhesive into the gap; curing the adhesive to form a partially cured adhesive; applying protective glue into the gap followed by covering the partially cured adhesive; an in-situ reaction occurs between the protective glue and the partially cured adhesive glue to form a chemical crosslink; curing the partially cured adhesive glue and the protective glue to form the adhesive layer and the protective layer covering the outer surface of the adhesive layer.

In the embodiments of the present disclosure, by adhering the first product housing and the second product housing of the product with an adhesive layer followed by disposing a protective layer on the adhesive layer, the adhesive layer could prevent the adhesive layer from erosion of external and human contaminants, which deteriorates the adhesive layer. Without deterioration, the adhesive layer can be healthy to stably bond the first product housing and the second product housing. Also, the protective layer would not affect the performance of the product.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and"comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals are used to refer to the same or similar elements throughout the disclosure.

Figure 1:
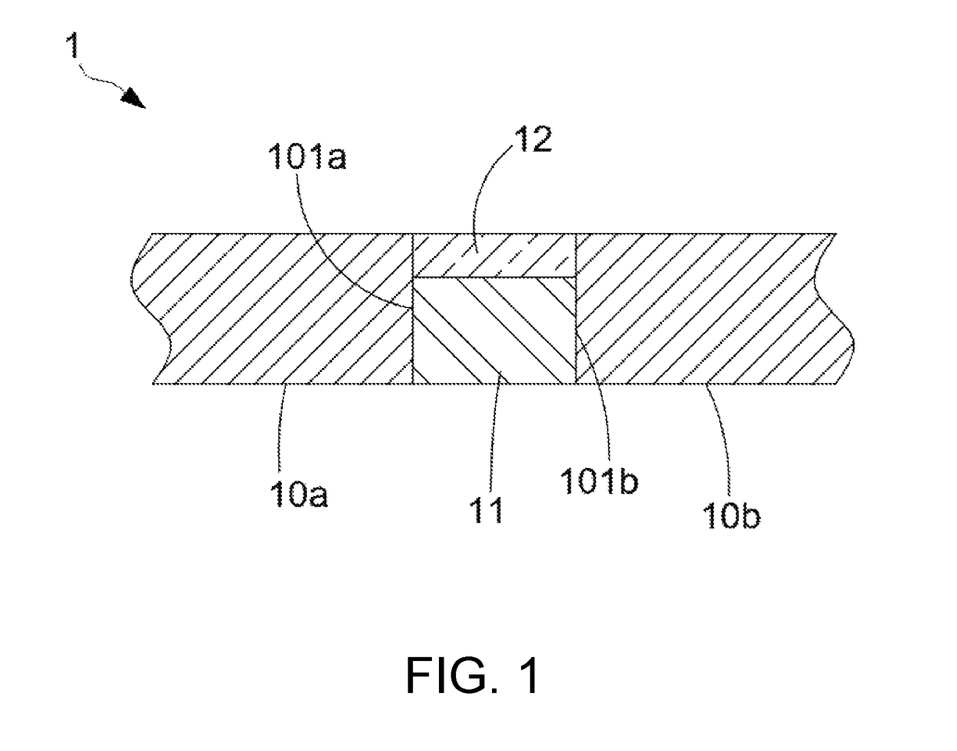
FIG. 1 is a structural schematic diagram of a product of one embodiment of the present disclosure.

FIG. 1 is a structural schematic diagram of a product of one embodiment of the present disclosure. As shown in the figure, the product 1 for preventing deterioration of the adhesive layer of this embodiment comprises a first product housing 10a, a second product housing 10b, an adhesive layer 11 and a protective layer 12. The first product housing 10a and the second product housing 10b are oppositely disposed. The first product housing 10a comprises a first connecting end surface 101a. The second product housing 10b comprises a second connecting end surface 101b. The first connecting end surface 101a is opposite to the second connecting end surface 101b. A gap exists between the first connecting end surface 101a and the second connecting end surface 101b. That is, the gap is between the first product housing 10a and the second product housing 10b. The adhesive layer 11 is disposed in the gap and also adheres to the first product housing 10a and the second product housing 10b. In this embodiment, the adhesive layer 11 is adhered to the first connecting end surface 101a and the second connecting end surface 101b. The material of the adhesive layer 11 of this embodiment comprises an adhesive resin, which can be well attached to the first product housing 10a and the second product housing 10b to realize the adhesion of the adhesive layer 11 to the first product housing 10a and the second product housing 10b. The adhesive resin is selected from the group consisting of organic silicone resin (such as silicone rubber resin), modified silicone resin (such as modified silane resin), epoxy resin, acrylic resin, polyurethane resin, and polyester resin. The polyurethane resin can be a reactive polyurethane hot melt adhesive.

The protective layer 12 is disposed on the adhesive layer 11 and is disposed in the gap between the first product housing 10a and the second product housing 10b. The protective layer 12 could protect the adhesive layer 11 from external contaminants (such as water vapor and dust) and human body contaminants (such as sweat and sebum) which erode and deteriorate the adhesive layer 11, maintaining excellent adhesion for the adhesive layer 11. The material of the protective layer 12 of this embodiment comprises a fluoropolymer, which can be one or more than one of fluorosiloxane polymers, fluoroacrylic polymers, fluoroacrylate polymers, fluoroepoxy polymers, fluoropolyether polymers, fluorocarbon polymers, fluoroalcohol compounds, fluoroisocyanate compounds, and fluorosulfonic acid compounds. The fluoropolymer is excellent water-repellent, oil-repellent and antifouling, which realizes the effect of the protective layer 12 to avoid external and human contaminants from eroding the adhesive layer 11 and effectively prevent the deterioration of the adhesive layer 11.

In one embodiment, the protective layer 12 comprises an alkoxylsiloxane compound having a weight percentage between 1 wt. % and 10 wt. %, a fluoropolymer having a weight percentage between 0.1 wt. % and 5 wt. %, a fluoro-solvent having a weight percentage between 10 wt. % and 28 wt. %, an ethyl nona fluoro-isobutyl Ether having a weight percentage between 40 wt % and 60 wt. %, an ethyl nona fluoro-butyl ether having a weight percentage between 25 wt. %, and 48 wt. %, and a fluorescent imaging agent having a weight percentage between 0.01 wt. % and 0.1 wt. %.

The fluorescent imaging agent could be selectively added or not. However, by adding the fluorescent imaging agent, it can be easily detecting the glue applying status online. In one embodiment, the fluorescent imaging agent is an external-adding fluorescent agent or an internal-adding fluorescent agent. The external-adding fluorescent agent comprises one or more than one of styrene fluorescent agent, coumarin fluorescent agent, pyrazoline fluorescent agent, benzoxazole fluorescent agent, dimethylformimide fluorescent agent. The internal-adding fluorescent agent is grafted to the protective layer 12 through one or more than one of bonding of epoxy, unsaturated triple bond, unsaturated double bond, silicone, —COONH—, —OH, —COOH, —NH2, —SH. When the protective layer 12 contains fluorescent imaging agent, the state of the protective layer 12 can be known through the fluorescent agent of the protective layer 12 for instant maintenance. It is also possible to add fluorescent imaging agent to the adhesive layer 11, that is, both the adhesive layer 11 and the protective layer 12 contain fluorescent imaging agent. In an embodiment, when both the adhesive layer 11 and the protective layer 12 contain a fluorescent imaging agent, the fluorescent imaging agent in the protective layer 12 and the fluorescent imaging agent in the adhesive layer 11 could be different. For example, when under ultraviolet light, they could present fluorescence in different colors of light indicating current states of the protective layer 12 and the adhesive layer 11 for maintenance of different layers when necessary. In another embodiment, the above effect can also be accomplished when the adhesive layer 11 contains a fluorescent imaging agent, but the protective layer 12 does not.

The material of the protective layer 12 of this embodiment further comprises an organic binder, which can be one or more than one of acrylic polymer, isocyanate polymer, polyurethane polymer, fluoropolymer. When the protective layer 12 is formed on the adhesive layer 11, the organic binder of the protective layer 12 can fill the gap due to the shrinkage of the curing process, so that the appearance of the product 1 can be kept in excellent condition.

In addition, the protective layer 12 can prevent external and human body contaminants from eroding the adhesive layer 11 and also prevent external and human body contaminants from entering the product 1. The protective layer 12 also protects the product 1. Two sides of the protective layer 12 are in close contact with the first connecting end surface 101a and the second connecting end surface 101b so that the protective layer 12 completely covers the outer surface of the adhesive layer 11. A part of the protective layer 12 can further infiltrate into the gap between the adhesive layer 11 and the first connecting end surface 101a, and the gap between the adhesive layer 11 and the second connecting end surface 101b, making the protective layer 12 having better protection effect. The protective layer 12 and the adhesive layer 11 are bonded by chemical crosslinking. The protective layer 12 is formed by being applying on the adhesive layer 11 followed by in-situ reaction crosslinking with the adhesive layer 11. The in-situ reaction crosslinking is to spray monomer and catalyst onto the object to be sprayed. The spray is polymerized into a polymer protective layer at the spraying position so that the adhesive layer 11 and the protective layer 12 could have excellent interlayer bonding strength. In this way, the protective layer 12 does not tend to fall off from the adhesive layer 11 easily, prolonging the service life of the adhesive layer 11, thereby extending the service life of the product 1.

In one embodiment, the width of the interval is between 1 um-5 mm. In one embodiment, the width of the gap is 200 um. The width of the gap between the first product housing 10a and the second product housing 10b lies within this range, ensuring that the adhesive layer 11 can firmly adhere to the first product housing 10a and the second product housing 10b. The thickness of the adhesive layer 11 is not thicker than the thickness of the first product housing 10a and the thickness of the second product housing 10b. In one embodiment, the ratio of the thickness of the adhesive layer 11 to the thickness of the first product housing 10a is between 1:(2 to 5). The ratio of the thickness of the adhesive layer 11 to the thickness of the second product housing 10b is between 1:(2 to 5). Specifically, it can be 1:2, 1:3, 1:4, 1:5, etc. Within this ratio range, the adhesion area of the adhesive layer 11 to the first connecting surface 101a of the first product housing 10a and the adhesion area of the adhesive layer 11 to the second connecting surface 101b of the second product housing 10b can be ensured. The adhesive layer 11 can firmly adhere to the first product housing 10a and the second product housing 10b.

In one embodiment, the thickness of the protective layer 12 is thinner than the thickness of the adhesive layer 11. In an embodiment, the ratio of the thickness of the protective layer 12 to the thickness of the adhesive layer 11 lies between 1:(2 to 100). Specifically, it can be 1:10, 1:20, 1:30, 1:40, 1:50, 1:60, 1:70, 1:80, 1:90, etc. In this way, the total thickness of the protective layer 12 with the adhesive layer 11 can be limited to keep the thickness of the first product housing 10a and the second product housing 10b from being too thick. Furthermore, the outer surface of the protective layer 12 is aligned with the outer surface of the first product housing 10a aligned with the outer surface of the second product housing 10b, flattening the outer surface of the product 1. In this way, the appearance of the product 1 is aesthetic.

The product 1 is usually a wearable device, a portable device or an electronic device that has been in contact with skin, such as smart bracelet, smartwatch, electronic watch, smart glasses, smart helmet, earphone (for example, wireless earphone, Bluetooth earphone, anti-noise earphone), virtual reality device, mobile phone, tablet or laptop computer.

It should be understood that although only a single adhesive layer 11 and a single protective layer 12 are shown in FIG. 1, the adhesive layer 11 or/and the protective layer 12 comprises multiple layers in fact. That is, the adhesive layer 11 comprises multiple adhesive sublayers, or the protective layer 12 comprises multiple protective sublayers, so the adhesion performance of the adhesive layer 11 or the protection performance of the protective layer 12 can be effectively improved. For example, the adhesive layer 11 can be single-layered with the protective layer 12 comprising two, three, or more than three protective sublayers. Or, the adhesive layer 11 can comprise two, three, or more than three adhesive sublayers with the protective layer 12 is single-layered. Or, the adhesive layer 11 can comprise two, three, or more than three adhesive sublayers with the protective layer 12 comprising two, three, or more than three protective sublayers. Users can choose different configuration combining adhesive sublayers and/or protective sublayers according to requirements, to optimize the adhesion performance of the adhesive layer 11 and the protection performance of the protective layer 12.

Figure 2:
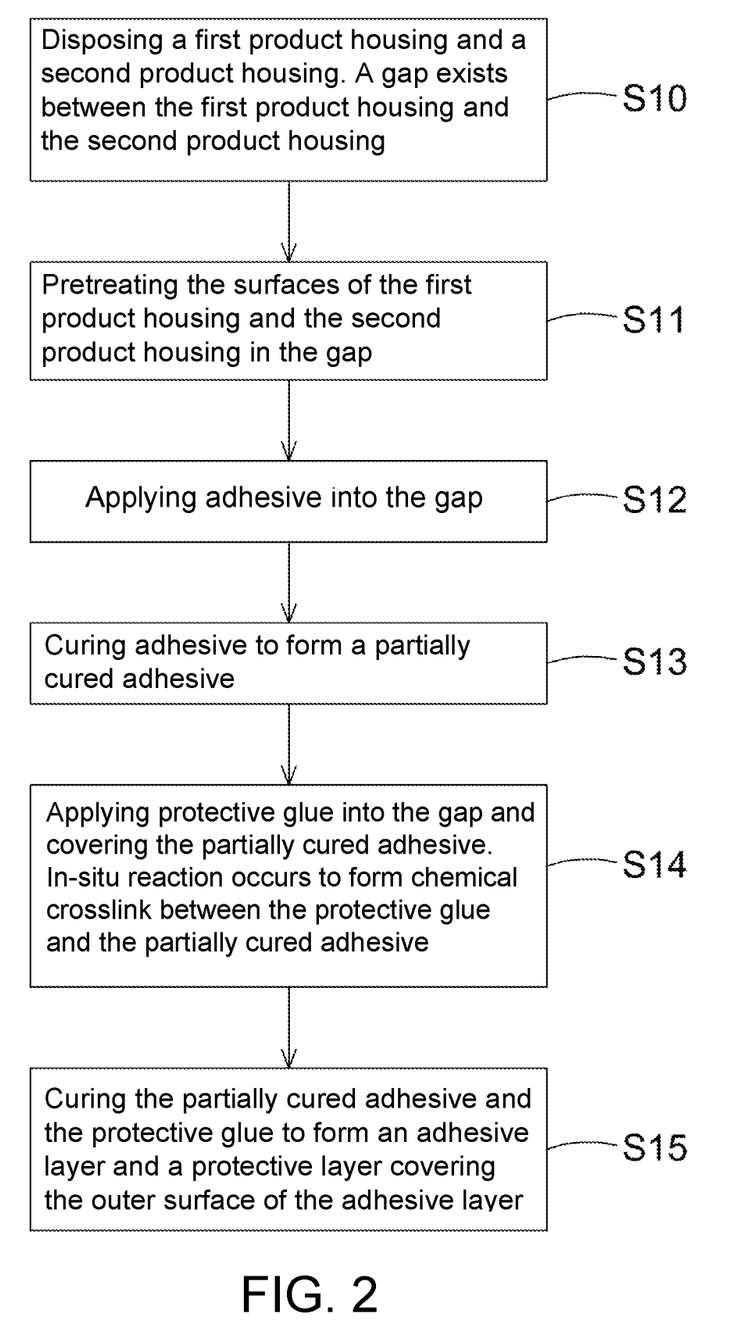
FIG. 2 is a flowchart of a method for manufacturing a product of one embodiment of the present disclosure.

FIG. 2 is a flowchart of a method for manufacturing a product of one embodiment of the present disclosure. As shown in the figure, the manufacturing method of the product 1 of this embodiment first executes the step S10, disposing the first product housing 10a and the second product housing 10b in which a gap exists between them. Then, execute step S12, applying an adhesive glue in the gap, in which the applying method is one or more than one of spraying, dispensing, brushing, dipping, atomizing spraying. Specifically, the adhesive can be first applied to the first connecting end 101a of the first product housing 10a by following the application method. Then bonding the first product housing 1a with adhesive to the second product housing 10b. The adhesive is attached to the second connecting end surface 101b of the second product housing 10b to adhere to the first connecting surface 101a and the second connecting surface 101b and to dispose the adhesive between the first product housing 10a and the second product housing 10b. The adhesive can also be applied to the second connecting end surface 101b of the second product housing 10b by the above application method, to adhere the second product housing 10b to the first connecting end surface 101a of the first product housing 10a through the adhesive disposed on the second connecting end surface 101b. Or, firstly apply the adhesive to the first connecting end surface 101a of the first product housing 10a and the second connecting end surface 101b of the second product housing 10b, respectively. The adhesive on the first connecting end 101a is then bonded to the adhesive on the second connecting end 101b. In one embodiment, the material of the adhesive comprises an adhesive resin selected from a group consisting of organic silicone resin, modified silicone resin, epoxy resin, acrylic resin, polyurethane resin, and polyester resin. In an embodiment, the adhesive material may further include a fluorescent imaging agent.

The step S13 cures the adhesive to form a partially cured adhesive. Specifically, partially cured adhesive means that the adhesive is partially cured, in which a part of the adhesive is in semi-solid, gel, or flowable condition. In this embodiment, the curing degree of the partially cured adhesive is between 50% and 90%. The curing method in the step of curing the adhesive is one or more than one of ultraviolet curing, thermal curing, moisture curing, and electron beam curing. It takes 2 hours to 48 hours for partially curing the adhesive to cured adhesive. The adhesive is partially cured at a temperature of 20° C. to 35° C. For example, curing the adhesive to form a partially cured adhesive can be carried out at an ambient temperature between 20° C. and 35° C. for 2 hours to 48 hours by moisture curing.

In step S14, a protective glue is applied to the gap, coveting a part of the cured adhesive. The protective glue is in-situ reacted with the partially cured adhesive to form chemical crosslinks. The applying method can be one or more than one of spraying, dispensing, brushing, dipping, atomizing spraying. Specifically, the protective adhesive can be applied to the partially cured adhesive by the above application method. In one embodiment, the material of the protective glue comprises fluoropolymer, which can be at least one of fluorosilicone polymer, fluoroacrylic polymer, fluoroacrylate polymer, fluoroepoxy polymer, fluoropolyether polymer, florocarbon polymer, fluoroalcohol compound, fluoroisocyanate compound and fluorosulfonic acid compounds, such as tridecafluorooctyltriethoxysilane. In one embodiment, the material of the protective glue may further include a fluorescent imaging agent. In this embodiment, the material of the protective glue comprises an organic binder, which can be at least one of acrylic polymer, isocyanate polymer, polyurethane polymer, fluoropolymer.

In the final step S15, the partially cured adhesive and protective glue are cured to form an adhesive layer 11 and a protective layer 12 covering the outer surface of the adhesive layer 11. The curing method in the step of curing the partially cured adhesive and protective glue is one or more than one of ultraviolet curing, thermal curing, moisture curing, and electron beam curing. The time for partially cured adhesives and protective adhesives to be cured into adhesive layers and protective adhesives is 48 hours. The temperature for partially cured adhesives and protective adhesives to be cured into adhesive layers and protective adhesives are between 20° C. and 25° C. In one embodiment, the curing can be accelerated by increasing the temperature, for example, curing in an environment of 80° C.

The manufacturing method of this embodiment first cures the adhesive as a partially cured adhesive, then applies a protective adhesive to the partially cured adhesive, and finally cures the partially cured adhesive and the protective adhesive to form an adhesive layer 11 and a protective layer 12. As mentioned above, the curing degree of the partially cured adhesive is between 50% and 90%. The curing degree of the partially cured adhesive would affect the adhesion of the adhesive layer 11. In addition, when the curing degree of the partially cured adhesive is too low, after applying the protective glue on the partially cured adhesive, the adhesive layer 11 formed by curing of the cured partially cured adhesive can hardly adhere to the first product housing 10a and the second product housing 10b; when the curing degree of the partially cured adhesive is too high, after applying the protective glue on the partially cured adhesive, the adhesion between the protective layer 12 formed by curing the protective glue and the partially cured adhesive is also hardly adhering to the adhesive layer 11 since the protective glue is difficult to infiltrate into the interior of the partially cured adhesive glue.

In one embodiment, in the step S11, a pretreating is performed to the surfaces of the first product housing 10a and the second product housing 10b in the gap. In this embodiment, the pretreating is performed to the first connecting end surface 101a and the second connecting end surface 101b. The pretreating comprises one or more than one of plasma treatment, discharge treatment, sandblasting treatment, tumbling treatment, flame treatment, primer treatment. The pretreated first connecting end face 101a and the second connecting end face 101b would form a microstructure thereon, enabling the adhesive to well adhere to the first connecting end surface 101a and the second connecting end surface 101b when applying the adhesive into the gap.

In the following description, tests would be performed to the product without the protective layer 12 and the product 1 coated with the protective layer 12, in which a product without the protective layer 12 is provided as a control sample 1, and a product 1 with the protective layer 12 is provided as sample 1. In the control sample 1, only the adhesive layer 11 is provided in the gap between the first product housing 10a and the second product housing 10b, that is, the protective layer 12 is not provided on the adhesive layer 11. Polyurethane resin is used for the material of the adhesive layer 11, such as reactive polyurethane hot melt adhesive. The sample 1 is provided with a protective layer 12 on the adhesive layer 11 of the control sample. The material of the protective layer 12 of the sample 1 is a fluorosiloxane polymer, such as tridecylfluorooctyltiethoxysilane. The sample 1 was prepared based on the manufacturing method of this disclosure, in which the curing time in the step of curing the adhesive is controlled between 2 hours and 48 hours, and the curing temperature is controlled at between 20° C. and 35° C. The curing time in the step of curing the partially cured adhesive and protective adhesive is controlled at 48 hours, and the curing temperature is controlled at room temperature.

Firstly, test the permeability, shear strength, and cross shear strength of control sample 1 and sample 1. Then, treat the control sample 1 and sample 1 with oleic acid treatment, which refers to smearing oleic acid on the control sample 1 and the sample 1 followed by placing the control sample 1 and the sample 1 in an environment controlled box at 65° C. and 90% humidity for 48 hours. Finally test the infiltration, shear strength, and cross shear strength of the control sample 1 and the sample 1 after treated with oleic acid treatment. The test results are shown in Table 1.

TABLE 1

| Testing sample | Testing on | Before oleic acid treatment | After oleic acid treatment |
| --- | --- | --- | --- |
| Control sample 1 | Infiltration | White | Yellow |
| | Shear strength | 8.6 Mpa | 3.9 Mpa |
| | Cross shear strength | 9.8 Mpa | 1.8 Mpa |
| Sample 1 | Infiltration | White | White |
| | Shear strength | 7.5 Mpa | 4.6 Mpa |
| | Cross shear strength | 8.6 Mpa | 3.2 Mpa |

It can be seen from the above that an obvious color change of the infiltration of the control sample 1 after being treated with oleic acid treatment, from white to yellow. The sample 1 showed color retention in white. That is, the adhesive layer 11 is protected by the protective layer 12 to effectively prevent the infiltrating of oleic acid into the adhesive layer 11. Both the shearing ability and the cross shearing ability were greatly attenuated compared to the control samples before the oleic acid treatment, which means that the interface of the adhesive layer 11 of the control sample 1 was damaged by oleic acid, which greatly attenuated the adhesive strength of the adhesive layer 11 of the control sample 1. The shearing ability and cross shearing ability of sample 1 after oleic acid treatment are pretty much comparable to those of sample 1 before oleic acid treatment. So, the protective layer 12 in the sample 1 can keep the adhesive layer 11 in good adhesion strength.

Figure 3:
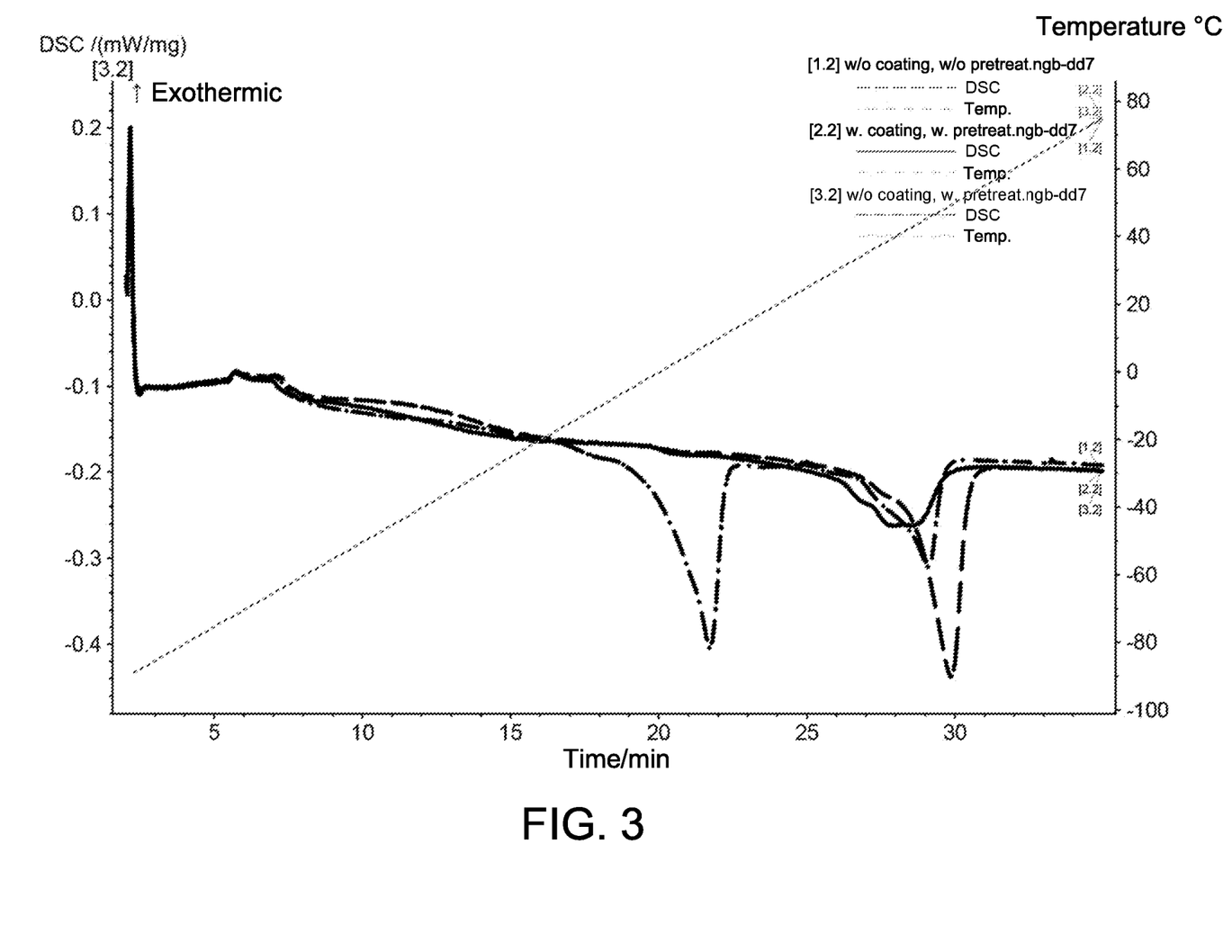
FIG. 3 is a DSC spectrum of a product of one embodiment of the present disclosure.

FIG. 3 is a DSC spectrum of a product of one embodiment of the present disclosure. As shown in the figure, the dashed line is the thermal change curve of the control sample 1 without oleic acid treatment. The dot-dashed line is the thermal change curve of control sample 1 treated with oleic acid. The solid line is the thermal change curve group of sample 1 treated with oleic acid. This test is conducted from −90° C. to ° C. with a temperature rise of 10° C. per minute. It can be seen from the heat change curve of control sample 1 that has not been treated with oleic acid that the control sample 1 without oleic acid treatment showed an endothermic peak only at approximately 30 minutes (corresponding temperature of 50° C.). It can be seen from the heat change curve of control sample 1 that has been treated with oleic acid that the control sample 1 treated with oleic acid showed a new endothermic peak at 22 minutes (corresponding temperature of 10° C.). This phenomenon indicates that a large amount of oleic acid infiltrated into the adhesive layer 11. It can also be seen from the heat change curve of control sample 1 that has been treated with oleic acid that the sample 1 treated with oleic acid showed no new absorption peak at 22 minutes (corresponding temperature of 10° C.), which shows that the protective layer 12 effectively blocks the infiltration of external oleic acid.

The adhesive layer 11 and the protective layer 12 of the present application are used for the adhesion of the two housings of the earphone, referred to as sample 2 hereinafter. Two housings bonding the earphones with only the adhesive layer 11 are provided as control sample 2. The material of the adhesive layer 11 of the control sample 2 is identical to the material of the control sample 1. The materials of the adhesive layer 11 and the protective layer 12 of the sample 2 are identical to the materials of the adhesive layer 11 and the protective layer 12 of the sample 1. The manufacturing method of sample 2 is also identical to the manufacturing method of sample 1.

The red ink test, artificial sebum test, artificial sweat test, and oleic acid test are conducted to the control sample 2 and the sample 2. The red ink test is to smear the red ink evenly on the joint between the two housings of the earphone, which is then placed in the oven at 55° C. for 90 minutes, then observe whether the red ink infiltrates into the inside of the earphone. The artificial sebum test is to apply the artificial sebum evenly to the joint between the two housings of the earphones, which is then placed in an environment controlled box set at 65° C. and 90% humidity for 48 hours, then test the acoustic performance of the earphone. The artificial sweat test is to apply artificial sweat evenly to the joint between the two housings of the earphones, which is then placed in an environment controlled box set at 65° C. and 90% humidity for 48 hours, then test the acoustic performance of the earphone. The oleic acid test is to apply oleic acid evenly to the joint between the two housings of the earphones, which is then placed in an environment controlled box set at 65° C. and 90% humidity for 48 hours, then test the acoustic performance of the earphone. The test results of control sample 2 and sample 2 are shown in Table 2.

T refers to the total number of products tested, F refers to the total number of defective products. The defective products mean that the red ink infiltrates into the product or the product performance (such as poor acoustic performance) does not meet the specifications. As can be seen from the above, if the protective layer 12 is not provided on the outer surface of the adhesive layer 11, external and human contaminants would affect the acoustic performance of the earphones, as shown in the test result of the control sample 2. If a protective layer 12 (ie with the structural configuration of the present application) is provided on the outer surface of the adhesive layer 11, the protective layer 12 can isolate external and human contaminants, so that the earphones still conduct excellent acoustic performance, as shown in the test result of the control sample 2.

In addition, the adhesive layer 11 and the protective layer 12 of the present disclosure are used for the adhesion of two test pieces, hereinafter referred to as sample 3. Meanwhile, the adhesive layer 11 of the present disclosure is used for bonding two test pieces, hereinafter referred to as control sample 3. The material of the adhesive layer 11 of the control sample 3 is identical to the material of the control sample 1. The materials of the adhesive layer 11 and the protective layer 12 of sample 3 are identical to the materials of the adhesive layer 11 and the protective layer 12 of sample 1.

The preparation of sample 3 is as follows: a first test piece is provided, and a square surrounding adhesive layer 11 and a protective layer 12 are provided on the first test piece, the protective layer 12 is disposed on the inside of the adhesive layer 11, and the protective layer 12 has an accommodating space. A second test piece is disposed on the adhesive layer 11 and the protective layer 12. The second test piece has a window corresponding to the accommodating space to expose the side surface of the protective layer 12 to have the sample preparation ready. The preparation of control sample 3 only removes the protective layer 12 of sample 3, and the side surface of the adhesive layer 11 is directly exposed.

Then, apply 0.5 ml of oleic acid, sebum, and sweat to the adhesive layer 11 of control sample 3 exposed from the accommodating space and the protective layer 12 of sample 3 exposed from the accommodating space, respectively. Place control sample 3 and sample 3 in an environment-controlled box at a temperature of 65° C. and a humidity of 90% for 72 hours. The humidity refers to the relative humidity herein, but it is not limited thereto. Observe the ejection strength of control sample 3 and sample 3 and the degree of infiltration of the adhesive layer 11 of the control sample 3 and the sample 3 by oleic acid, sebum, and sweat. The testing conditions of control sample 3 and sample 3 are shown in table 3, and the testing results of the control sample and sample 3 are shown in Table 4 as follows.

TABLE 2

| Testing with | Condition | control sample 2 | sample 2 |
| --- | --- | --- | --- |
| Red ink | 55° C./90 minutes | 10F/10T | 1F/10T |
| Artificial sebum | 65° C./90% humidity/48 hours | 5F/10T | 0F/10T |
| Artificial sweat | 65° C./90% humidity/48 hours | 2F/10T | 0F/10T |
| Oleic acid | 65° C./90% humidity/48 hours | 6F/10T | 1F/10T |

TABLE 3

| Material | Test pieces | Polycarbonate |
| --- | --- | --- |
| Sample | Reactive polyurethane | Henkel 3542 |
| | Adhesive area | 225 mm$^2$ |
| | Adhesive Thickness | 150 um |
| | Colloid cleaning | Remove the glue in the inner cavity for one week after the reactive polyurethane is applied for 30 minutes |

TABLE 3-continued

| Material | Test pieces | Polycarbonate |
|---|---|---|
| | Dipping in fluorinated liquid | Immerse the whole sample in fluorinated solution, then taken out and let still for 5 minutes, repeat 3 times |
| | Post-curing conditions | Cure for 72 hours at 25° C./50% humidity |
| | Chemicals | 0.5 ml evenly applied around the polycarbonate cavity of the window |
| Chemical resistance condition | Oleic acid, 0.5 mL | 65° C./90% humidity/72 hours |
| | Sebum, 0.5 mL | 65° C./90% humidity/72 hours |
| | Sweat, 0.5 mL | 65° C./90% humidity/72 hours |
| Test Conditions | Temp. Regain time | 2 hours |
| | Ejection strength test speed | 10 mm/minutes |

TABLE 4

| Testing with | Testing on | Control sample 3 | Sample 3 |
|---|---|---|---|
| Before testing | Ejection strength (Mpa) | 5.727 | 6.109 |
| oleic acid | Ejection strength (Mpa) | 0.11 | 0.247 |
| | Infiltration depth (mm) | 2.50 | 1.224 |
| sebum | Ejection strength (Mpa) | 1.367 | 5.573 |
| | Infiltration depth (mm) | 1.85 | 0 |
| sweat | Ejection strength (Mpa) | 3.972 | 4.171 |
| | Infiltration depth (mm) | 0.47 | 0 |

As shown in Table 4, since the width of the adhesive layer 11 is only 2.5 mm, the infiltration depth for a full penetration equals to 2.5 mm. In the testing results, the ejection strength of the control sample 3 after sebum testing and testing decreased significantly, while the ejection strength of sample 3 after sebum testing and sweat testing decreased only partly. As shown in Table 4, oleic acid infiltrates into control sample 3 and sample 3 more easily than sebum and sweat. The infiltration depth of the oleic acid into control sample 3 is 2.5 mm, and the oleic acid completely infiltrates into control sample 3. The ejection strength of control sample 3 after oleic acid testing is only 0.11 MPa. Compared with control sample 3, the infiltration depth of the oleic acid into sample 3 is about half of the infiltration depth for a full penetration, and sample 3 after the oleic acid resistance has better ejection strength. Sample 3 only partially infiltrated in the oleic acid testing, while in the sample 3 the sebum testing and the sweat testing were not infiltrated. It should be noted that the zero infiltration depth herein only means that the infiltration cannot be observed by eyes. On the contrary, the adhesive layer 11 of the control sample 3 was infiltrated in all three tests, particularly the oleic acid which infiltrates all the way down to the bottom, which is, infiltrating from an outer surface to an inner surface of the adhesive layer 11. Therefore, the testing results show that the adhesive layer 11 provided with the protective layer 12 can effectively isolate external and human contaminations.

In summary, embodiments of the present disclosure provide a product for preventing the deterioration of an adhesive layer and a method for manufacturing the product. By adhering to the first product housing and the second product housing of the product with an adhesive layer followed by disposing a protective layer on the adhesive layer, the protective layer could prevent the adhesive layer from erosion of external and human contaminants, which deteriorates the adhesive layer. Without deterioration, the adhesive layer can be healthy to stably bond the first product housing and the second product housing. In addition, the protective layer would not affect the performance of the product.

It is to be understood that the term "comprises", "comprising", or any other variants thereof, is intended to encompass a non-exclusive inclusion, such that a process, method, article, or device of a series of elements not only comprise those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A product for preventing the deterioration of an adhesive layer, comprising:
    a first product housing;
    a second product housing opposite to the first product housing; a gap existing between the second product housing and the first product housing;
    the adhesive layer disposed in the gap between the first product housing and the second product housing, adhering to the first product housing and the second product housing, wherein material of the adhesive layer comprises a reactive polyurethane hot melt adhesive;
    a protective layer disposed on the adhesive layer; the protective layer disposed in the gap, covering an outer surface of the adhesive layer; the protective layer bonding and cross-linking to the adhesive layer chemically, wherein material of the protective layer comprises a fluoropolymer, the fluoropolymer is at least one of fluorosilicone polymer, fluoroacrylic polymer, fluoroalcohol compounds, and fluorosulfonic acid compounds.

2. The product according to claim 1, wherein the protective layer is formed by being applied on the adhesive layer followed by in-situ reaction crosslinking with the adhesive layer.

3. The product according to claim 1, wherein a width of the gap is between 1 um-5 mm.

4. The product according to claim 3, wherein a thickness of the protective layer is thinner than the thickness of the adhesive layer.

5. The product according to claim 4, wherein a ratio of the thickness of the protective layer to the thickness of the adhesive layer is between 1:(2 to 100).

6. The product according to claim 1, wherein an outer surface of the protective layer, an outer surface of the first product housing and an outer surface of the second product housing are aligned with each other.

7. The product according to claim 1, wherein at least one of the material of the adhesive layer and the material of the protective layer comprises a fluorescent imaging agent.

8. The product according to claim 7, wherein the fluorescent imaging agent is an external-adding fluorescent agent comprising one or more than one of styrene type fluorescent agent, coumarin type fluorescent agent, pyrazoline type fluorescent agent, benzoxazole type fluorescent agent, dimethylformimide type fluorescent agent.

9. The product according to claim 7, wherein the fluorescent imaging agent is an internal-adding fluorescent agent, and the internal-adding fluorescent agent is grafted to the protective layer and/or the adhesive layer through one or more than one of bonding of epoxy, unsaturated triple bond, unsaturated double bond, silicone, —COONH—, —OH, —COOH, —NH2, —SH.

10. The product according to claim 7, wherein the material of the adhesive layer and the material of the protective layer both comprise a fluorescent imaging agent; the fluorescent imaging agent of the adhesive layer is different from the fluorescent imaging agent of the protective layer.

11. A method for manufacturing the product according to claim 1, comprising:
disposing the first product housing and the second product housing; the gap existing between the first product housing and the second product housing;
applying an adhesive comprising the reactive polyurethane hot melt adhesive into the gap;
curing the adhesive to form a partially cured adhesive;
applying protective glue comprising the fluoropolymer into the gap followed by covering the partially cured adhesive; an in-situ reaction occurs between the protective glue and the partially cured adhesive to form a chemical crosslink;
curing the partially cured adhesive and the protective glue to form the adhesive layer and the protective layer covering the outer surface of the adhesive layer.

12. The method according to claim 11, further comprising pretreating the surfaces of the first product housing and the second product housing in the gap before the step of applying the adhesive into the gap; the pretreating comprises one or more than one of plasma treatment, discharge treatment, sandblasting treatment, tumbling treatment, flame treatment, primer treatment.

13. The method according to claim 11, wherein each of the step of applying the adhesive into the gap and in the step of applying the protective glue into the gap is one or more than one of spraying, dispensing, brushing, dipping, atomizing spraying.

14. The method according to claim 11, wherein the curing method in the step of curing the adhesive and in the step of curing the partially cured adhesive and the protective glue is one or more than one of UV curing, thermal curing, moisture curing, electron beam curing.

15. The method according to claim 11, wherein a therein curing time in the step of curing the adhesive is between 2 and 48 hours; a therein curing temperature is between 20 to 35 degrees Celsius.

16. The method according to claim 11, wherein a therein curing time in the step of curing the partially cured adhesive and the protective glue is 48 hours; a therein curing temperature is between 20 to 25 degrees Celsius.

* * * * *